United States Patent
Flanigan

[15] 3,640,026
[45] Feb. 8, 1972

[54] WORKPIECE TRANSFER MECHANISM FOR CENTERLESS GRINDER OR THE LIKE

[72] Inventor: Richard J. Flanigan, Longmeadow, Mass.
[73] Assignee: Gulf & Western Precision Engineering Company, Manchester, Conn.
[22] Filed: May 22, 1970
[21] Appl. No.: 39,802

[52] U.S. Cl. ..................................51/215 R, 214/1 BD
[51] Int. Cl. ..................................B24b 5/32
[58] Field of Search .......51/103 WH, 103 R, 215 R, 215 AR, 51/215 AM, 215 CP, 165.9; 214/1 BD, 147 T; 221/210, 212, 262

[56] References Cited

UNITED STATES PATENTS

| | | | |
|---|---|---|---|
| 2,802,586 | 8/1957 | Wingard | 214/1 BD X |
| 2,874,518 | 2/1959 | Balsiger | 51/103 WH |
| 2,912,798 | 11/1959 | Seidel | 51/103 WH |
| 3,000,516 | 9/1961 | Dixon | 214/1 BD |
| 3,226,886 | 1/1966 | Seidel | 51/215 |
| 3,420,008 | 1/1969 | Uhtenwoldt | 51/215 |

Primary Examiner—Donald G. Kelly
Attorney—McCormick, Paulding & Huber

[57] ABSTRACT

A mechanism for sequentially transferring annular workpieces to and from the work station of a centerless grinder and including a frame mounted for limited sliding movement parallel to the axis of rotation of a workpiece located at the work station, a workpiece loading arm pivotally mounted in the frame for rotational movement in a plane perpendicular to the direction of movement of the frame and between angular limits defined by the work station and a load station, and a workpiece unloading arm pivotally mounted in the frame for rotational movement in substantially the same plane between angular limits defined by the work station and an unload station. First and second crank arms have pin members thereon that engage and drive first and second geneva quadrants, which quadrants respectively drive the loading and unloading arms intermittently between their respective angular limits and with dwell intervals at each associated station. The oscillating motion of these arms is so timed that as the loading arm is moved from the load station to the work station it lags the unloading arm as the latter moves from the work station to the unload station. The sliding frame is moved forwardly during a dwell overlap interval when the loading arm is at the loading station and the unloading arm is at the work station and said frame moves rearwardly during the dwell overlap interval when the loading arm is at the work station and the unloading arm is at the unload station.

22 Claims, 5 Drawing Figures

PATENTED FEB 8 1972

INVENTOR
RICHARD J. FLANIGAN

By McCormick, Paulding & Huber
Attorneys

WORKPIECE TRANSFER MECHANISM FOR CENTERLESS GRINDER OR THE LIKE

BACKGROUND OF THE INVENTION

This invention relates to a workpiece transfer mechanism for a centerless grinder, and deals more particularly with a mechanism capable of sequentially loading and unloading workpieces to and from the work station of a centerless grinder or the like.

In centerless grinding machines numerous mechanisms have been proposed for minimizing the machine time involved to transfer a workpiece from a supply chute to an operating or work station, and also in transferring the ground workpiece to a discharge or unload chute after the grinding operation has been performed. This is particularly true in grinding operations wherein the workpiece is placed on shoes so that one or more grinding operations can be performed on the workpiece. It will be appreciated that it is desirable to perform the loading and unloading operations as quickly as possible.

One method for loading and unloading workpieces from the operating station is shown in U.S. Pat. No. 2,912,798, issued to Seidel et al., Nov. 17, 1959. In the Seidel patent a loading and unloading arm are simultaneously moved from workpiece pickup to workpiece discharge positions to shuttle the workpieces through a common work station at which a grinding wheel operates on the workpieces. In this particular workpiece loading mechanism a rather complex mechanism is provided to accomplish this straightforward function. In particular, two rack gear mechanisms are provided to insure that the arms accelerate slowly during the initial part of the rotation of the arms and decelerate during the final portion of the rotation of the arms during each cycle. Without the complex dual rack mechanisms the arms would not be accelerated and decelerated slowly during these phases of the cycle. Further, this patent shows no means for adjusting the sequence of rotation of one arm with respect to the other. With the mechanism of the Seidel patent, both arms must begin and end their oscillatory movement simultaneously.

Accordingly, one object of the present invention is to provide a less complex workpiece transferring mechanism wherein the acceleration and deceleration of the workpieces is not only provided for, but wherein movement of the loading arms with respect to that of the unloading arm can also be accomplished to avoid the disadvantages associated with the simultaneously movable arms in the Seidel mechanism.

A more specific object is to provide means for adjusting the phase relationship between the loading and unloading arms of a mechanism of the foregoing character so that the loading arm in picking up a workpiece from the load station and transferring it to the work station will lag the unloading arm as the latter picks up a workpiece at the work station to transfer it to the unload station, which means thereby provides adequate clearance between the arms adjacent the work station.

Still another object of the present invention is to provide a compact and relatively simple mechanism of the foregoing character wherein the loading arm and unloading arm are accelerated slowly during their initial movement, and are decelerated during the final portion of their movement without resorting to complex motion transmitting mechanisms such as those shown and described in the Seidel patent.

SUMMARY OF THE INVENTION

In accordance with the present invention there is provided a mechanism for sequentially transferring workpieces to and from a work station, including a frame mounted for limited sliding movement parallel to the axis of rotation of the workpieces when they are located at the work station, a workpiece loading arm pivotally mounted on the frame for oscillatory movement in a plane perpendicular to the direction of movement of the frame and between angular limits defined by the work station and a load station, and a workpiece unloading arm pivotally mounted on the frame for oscillatory movement in substantially the same plane between angular limits defined by the work station and an unload station. Intermittent motion means are provided for driving the loading and unloading arms between their respective angular limits and one of said means is adjustable with respect to the other to permit the dwell intervals at each associated station to be varied so that the motion of one arm is timed with respect to the other to improve the overall efficiency of the device. The loading arm is moved from the load station to work station but lags the unloading arm as the latter moves from the work station to the unload station. Adequate clearance is provided between the workpieces carried by the arms in the vicinity of the work station. Drive means is provided for moving the sliding frame forwardly during a dwell overlap interval when the loading arm is at the loading station and the unloading arm is at the work station, and said drive means moves the frame rearwardly during the dwell overlap interval when the loading arm is at the work station and the unloading arm is at the unload station.

BRIEF DESCRIPTION OF THE DRAWINGS

FIG. 5 is a schematic diagram of a control circuit capable of operating the mechanism of FIG. 1.

DETAILED DESCRIPTION OF THE PREFERRED EMBODIMENT

Figure 1:
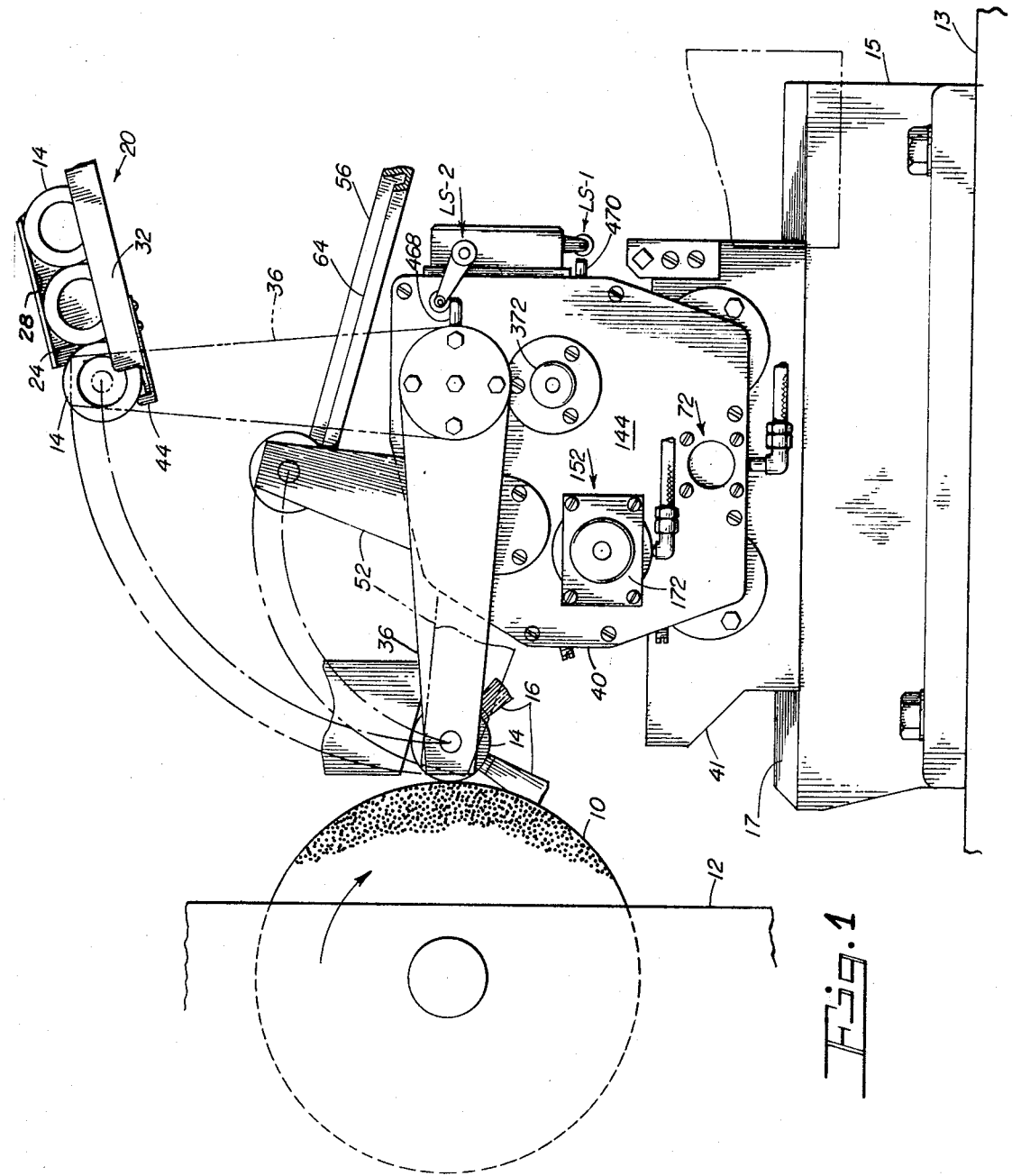
FIG. 1 is a slide elevational view of a workpiece loading and unloading mechanism embodying the present invention, showing in solid lines the loading and unloading arms at the work station and the unload stations, respectively, and at the load and the work station, respectively, in phantom lines.

Turning now to the drawings in greater detail, FIG. 1 shows a workpiece transfer mechanism incorporating the present invention mounted on a conventional centerless grinding apparatus, the abrasive wheel for said apparatus being indicated generally at 10 and adapted for rotation in the direction of the arrow for grinding in a sequential fashion a plurality of annular workpieces fed to a work station defined in the grinding machine. The grinding wheel 10 is rotatably supported in a stationary frame 12 for rotation in a clockwise direction to grind the outer surface of a workpiece 14 positioned on the magnetic shoes 16, 16 at the work station. Means is provided for continuously magnetizing these shoes 16, 16 and the transfer mechanism to be described is effective to pull each workpiece 14 from the work station at the proper time during each cycle of the apparatus. The centerless grinding machine is of conventional construction and need not be described in detail herein, as the present disclosure relates to the mechanism for feeding annular workpieces such as ball bearing races sequentially to and from this work station.

A plurality of these annular workpieces, or ball bearing races 14, 14 are stored on an inclined supply chute 20 having a rear wall 24 and an upper wall 28 for supporting these workpieces on the inclined chute so that the workpieces 14, 14 are gravity biased against a fixed stop 44 located at the lower end of the chute 20. The chute 20 has a front wall 32 which terminates short of the lower end of the chute 20 so that the lowermost annular workpiece may be acted upon by a pintle 37 on the loading arm 36 of the transfer mechanism to be described for sequential transfer of these workpieces to the work station. When the lowermost workpiece is withdrawn by the loading arm 36, the next succeeding workpiece will roll downwardly in the chute 20 so as to abut the raised portion or stop 44 at the lower end of said chute with the result that the remaining workpieces are contained in said chute for sequential withdrawal by the workpiece loading arm 36.

Figure 3:
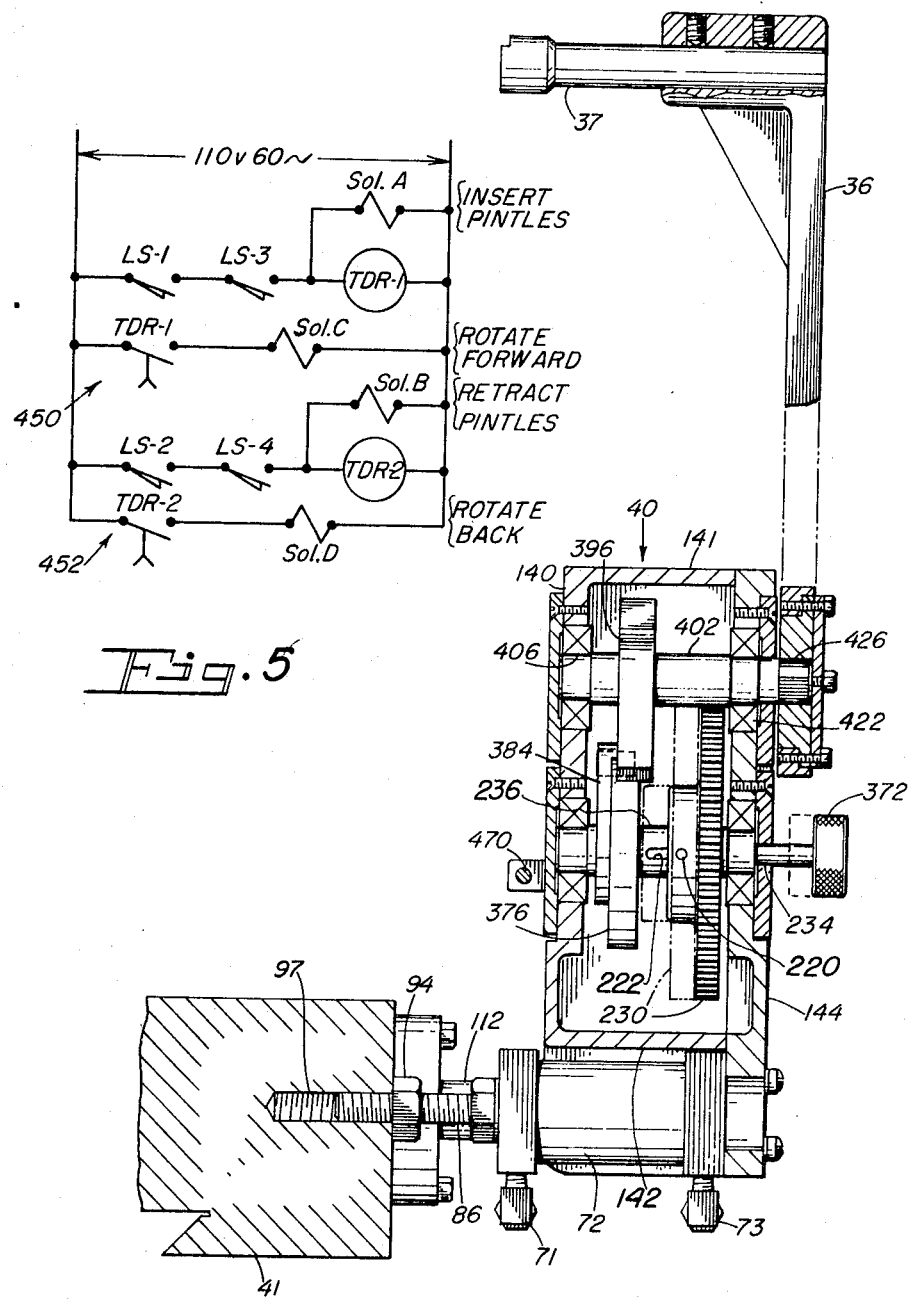
FIG. 3 is a vertical sectional view taken along line 3—3 of FIG. 2.

The workpiece loading arm 36, shown to better advantage in FIG. 3, comprises a crank arm oscillatable between the positions shown in the solid and phantom lines in FIG. 1, and having a pintle 37 upon which the annular workpiece, or ball bearing race 14 is adapted to be supported for transfer from a supply chute 20 to the work station as outlined above. The loading arm 36 is rotatably mounted in a frame 40 which defines a suitable bearing for rotatably supporting the crank arm 36 for rotation about an axis parallel to the axis of rotation of the grinding wheel 10 and of the workpiece 14 at the work station. More particularly, the loading arm 36 moves in a plane which is oriented perpendicularly with respect to the axes of rotation of the grinding wheel 10 and of the workpiece 14 being acted upon by said wheel. The frame 40 is slidably supported for movement in a forward direction so as to cause the pintle portion 37 of the loading arm 36 to enter the opening defined in the annular workpiece 14 prior to movement of said loading arm from the phantom line position shown in FIG. 1 to the solid line position shown in that view so as to transfer a workpiece from the supply chute 20 to the work station.

An unloading arm 52 is adapted to transfer the workpieces sequentially from the work station defined by the shoes 16, 16 to a discharge chute 56 which is also inclined so as to permit the workpiece to roll downwardly on said chute under the influence of gravity into a proper storage bin or the like (not shown). The unloading arm 52 operates in timed relationship with the loading arm and is also pivotally mounted in the sliding frame 40 so that its pintle portion 53 can move forwardly into the opening defined by the workpiece 14 at the work station. The frame 40 can also be moved in a return or rearward direction so as to retract the pintle 53 from this opening in order to permit the workpiece 14 to roll downwardly on the discharge chute 56. The discharge chute 56 includes a front wall or flange 64 so that the workpieces are adapted to be stripped from the pintle 53 during return movement of the frame 40.

It is a feature of the present invention that the loading arm 36 and the unloading arm 52 do not rotate in unison with one another, but rather operate sequentially or slightly out of phase with respect to one another so that the unloading arm can move a workpiece from the work station toward the discharge chute prior to the point in time during the cycle of operation of the device when the loading arm begins its movement from the supply chute to the work station with a workpiece to be ground. More particularly, when the unloading arm 52 carrying a first ground workpiece has traversed a sufficient portion of its path so that the loading arm with is succeeding workpiece to be ground will clear the first workpiece on its way to the work station, the loading arm is moved downwardly to bring said succeeding workpiece to the work station. It will be apparent from the description to follow that this feature of the present invention, and the fact that the overlap interval between these arms can be adjusted in a manner to be described, permits the apparatus disclosed herein to handle workpieces of various diameters in a mechanism including arms of predetermined length operating through predetermined angular displacements. In this manner, convenient means is provided for allowing a proper clearance between these arms in the area of the work station while handling workpieces of various sizes.

Figure 2:
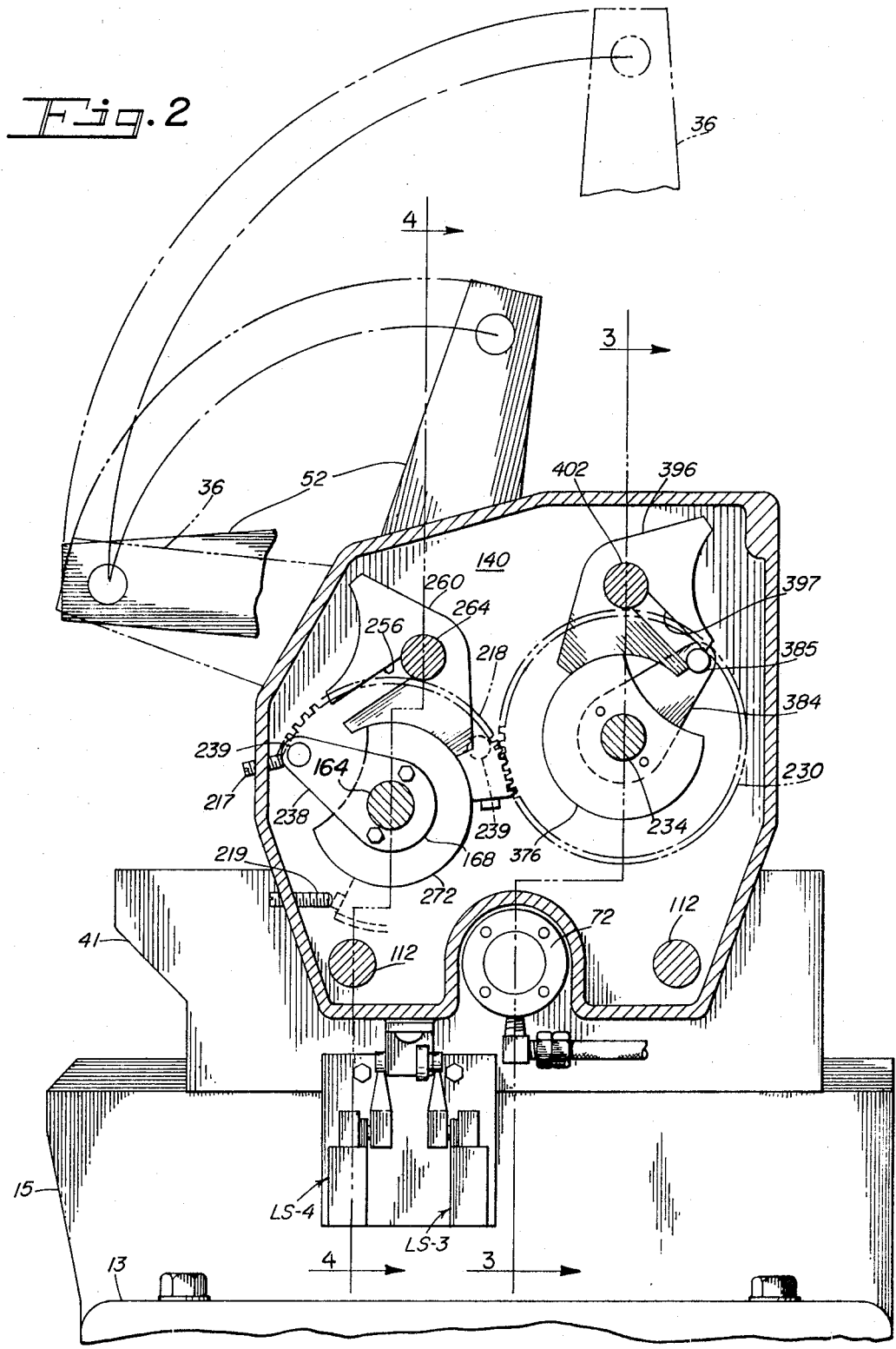
FIG. 2 is a vertical sectional view similar to FIG. 1 but showing the internal mechanism for moving the loading and the unloading arms.
Figure 4:
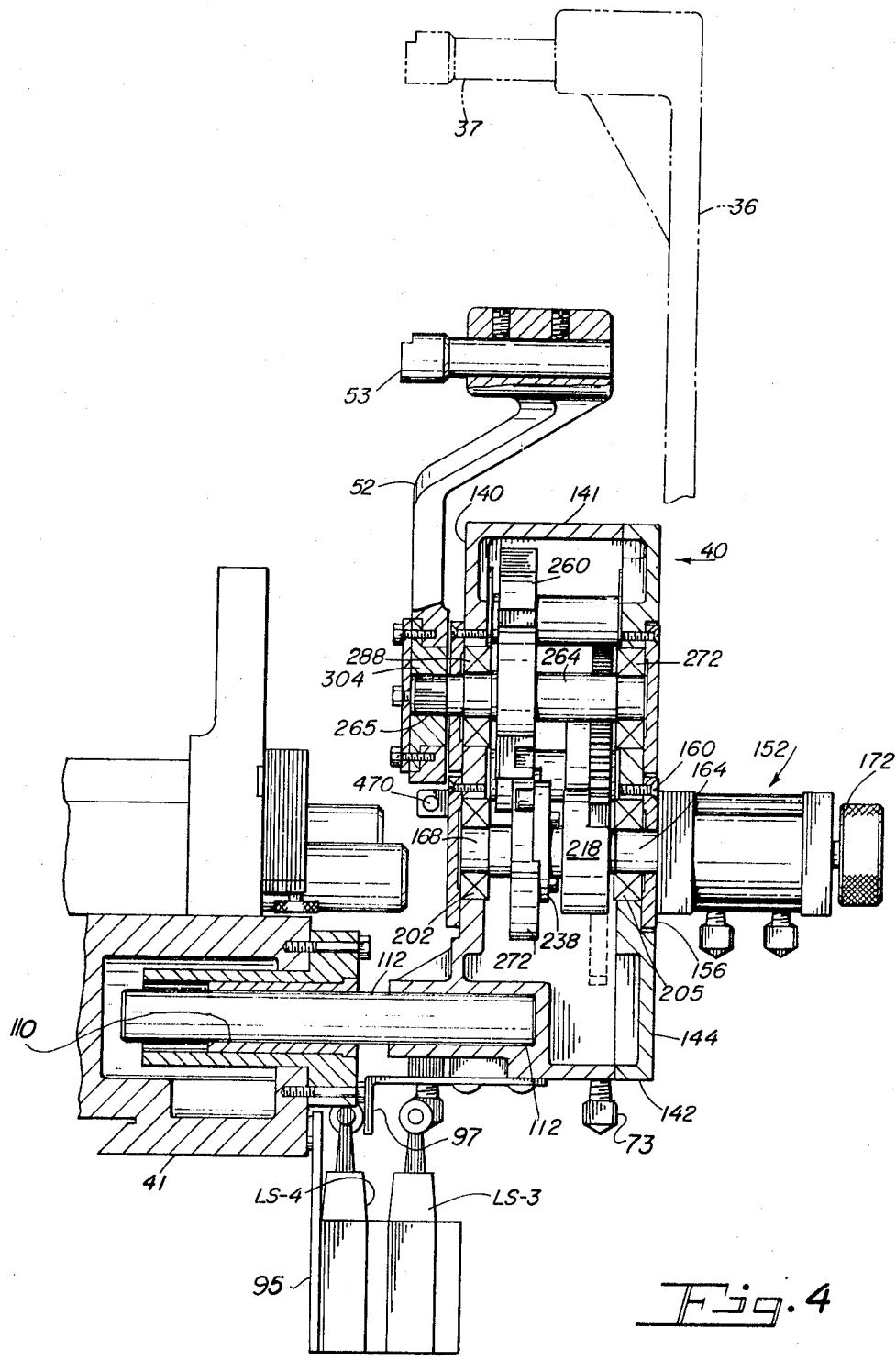
FIG. 4 is a vertical sectional view taken along line 4—4 of FIG. 2.

Turning now to a more complete description of the transfer mechanism and particularly the sliding frame 40 and its supporting means, FIG. 1 shows the fixed frame 12 of the conventional centerless grinding machine as having a horizontally extending bed 13 which is also fixed and to which is attached a mounting block 15 defining laterally extending ways 17. A slide block 41 is provided on the ways 17, and as best shown in FIGS. 3 and 4, the slide block 41 is adapted to be clamped in position for handling workpieces of predetermined size, and to define a pair of longitudinally extending guide rod openings 110, 110 which slidably receive a pair of parallel guide rods 112, 112 held in the sliding frame 40. Thus, the frame 40 is slidably supported on the block 41 by means of the guide rods for movement between the forward position in these views and the return or retracted positions wherein the pintles 37 and 53 are adapted to be retracted free of the workpieces in the manner described above. A double acting fluid cylinder 72 is provided for moving the sliding frame 40 between these two positions and as is conventional trapped fluid within the piston 72 is adapted to hold the frame in the last position selected by the control apparatus indicated generally in FIG. 5. In the embodiment shown the actuating cylinder 72 is mounted on the sliding frame 40 and has an actuating rod 86 controlled by alternately pressurized lines which are adapted to be pressurized or vented by solenoid valves (not shown) to be described in greater detail with reference to FIG. 5 hereinbelow. The actuating rod 86 of the double-acting fluid cylinder 72 has a threaded end portion which is threadably received in a threaded opening 97 in the slide block 41 comprising a part of the stationary frame of the machine. A lock nut 94 is provided for preventing relative rotation between the threaded rod 86 and its receptacle 97 in the slide block 41. As shown in FIGS. 2 and 4, limit switches LS-3 and LS-4 are provided below the frame 40, on a fixed bracket 95 supported in the slide block 41, for controlling solenoids A and B best shown in FIG. 5, which solenoids control the valves which in turn control the air motor 72 associated with inserting and retracting the pintles 37 and 53 at the proper times during the cycle of operation of the transfer mechanism to be described.

Still with reference to the slidably mounted frame 40, FIG. 4 shows this enclosure to include a front wall 140 and a rearwardly spaced rear wall 144 defining a hollow enclosure therebetween. The rear wall 144 is joined to the front wall 140 by top and bottom plate portions 141 and 142, respectively. A rotary-type fluid motor 152 is mounted on the rear wall 144 externally thereof so that its actuating or oscillatable output shaft 164 extends forwardly through an opening in the rear wall 144 into the hollow interior of the frame. A mounting plate 156 is provided for holding a bearing 205 in the rear wall 144, and a plurality of bolts 160, 160 support the plate 156, which in turn supports the rotary fluid motor 152. The motor 152 further includes a manually operable knob 172 to permit manual operation of the motor when fluid pressure is not available on both front and rear sides of its internal rotary device. Operation 152 is controlled by solenoids C and D, best shown in FIG. 5, and it will be apparent from this view that energizing solenoid C will be adapted to open a valve (not shown) to admit fluid under pressure to one side of the fluid motor 152 for rotating the output shaft 164 in a forward direction, whereas solenoid D is adapted to effect opposite motion of this shaft 164.

The output shaft 164 of the rotary or oscillatable fluid motor 152 includes a forward end 168 which is rotatably supported in the frame 40 by a bearing 202 mounted in the front wall 140, as well as being rotatably supported in the rear wall 144 by the bearing 205. The shaft 164 carries a gear segment 218 having teeth which mesh with a spur gear 230 provided on a second shaft 234 shown to best advantage in FIG. 2, the first shaft 168 is driven directly from the fluid motor 152 and oscillates the gear segment 218 between the solid line position shown in FIG. 2 to the phantom line position shown in that view and imparts a similar but opposite oscillatory motion to the spur gear 230. A pair of adjustable stop screws, indicated generally at 217 and 219 are provided in the frame 40 for limiting this oscillatory motion.

The relative angular relationship between the gear segment 218 and the spur gear 230 can be varied in order to allow the phase relationship between the loading and the unloading arms to be varied. This important feature of the apparatus is accomplished by moving a second knob 372 and its associated shaft 234 forwardly from the solid line position shown in FIG. 3 to the phantom line position shown, thus moving the spur gear 230 on shaft 234 out of engagement with the gear segment 218. A pin 220 is thereby disengaged from a slot 222 in the hollow shaft 236 which normally rotates with the shaft 234. This phase adjustment between the arms 36 and 52 can be conveniently accomplished by so disengaging the gears 218, 230 and by moving the knob 172 with respect to the second knob 372 provided for this purpose on the shaft 234 associated with the spur gear 230.

In order to achieve the intermittent motion of the loading and unloading arms 36 and 52, both of the oscillatable shafts 168 and 236 carry crank arms 238 and 384, respectively. The crank arm 238 is mounted on a rotating plate 272, which plate is in turn mounted on the first shaft 164 so that the crank arm 238 is oscillated between the position shown in FIG. 2 through approximately 120° in the clockwise direction to a position corresponding to the phantom line position of the gear segment 218. The crank arm 384 is mounted to a second plate 376 provided on the second shaft 236. Each of these crank arms 238 and 384 comprise a geneva driver which is adapted to oscillate between predetermined angular limits of travel in response to the solenoid valve controlled fluid motor 152.

The first geneva driver 238 is adapted to intermittently operate a geneva wheel quadrant 260 provided for this purpose on a third shaft 264 located above the drive shaft 164 in the sliding frame 40. The third shaft 264 is rotatably supported in bearings 288 and 272 provided for this purpose in the front and rear walls, 140 and 144, respectively, of the sliding frame, and said third shaft 264 includes a forwardly protruding forward end portion 265 which carries the oscillating unloading arm 52 as best shown in FIG. 4. The forward end portion 265 of the shaft 264 is splined so as to receive a splined insert 304 comprising the pivoted end portion of the unloading arm 52 so as to cause the arm to oscillate in response to oscillation of the third shaft 264. The geneva driver 238, and more particularly the plate portion thereof indicated generally at 272, includes a circular convex cam surface around a major portion of its periphery, which convex surface alternately meshes with concavely shaped arcuate surfaces on the geneva wheel quadrant for locking the third shaft 264 in predetermined limit positions for predetermined periods of time during the machine cycle. The workpiece unloading arm is thus held at the work station and also at its unload or discharge station for a predetermined dwell time, and the loading arm at the load station and work station, respectively.

With further reference to the plate member 272, that portion of its periphery which is not circular in shape for locking engagement with one or the other of the arcuate concave surfaces of the driven geneva quadrant is so shaped as to allow the driving pin 239 of the crank arm 238 to be received in a slot 256 provided for this purpose in the driven geneva quadrant so as to achieve the intermittent motion described above. It is of course characteristic of this geneva drive mechanism that a sinusoidal variation of angular position is achieved minimizing the acceleration and deceleration of the arms, and of the workpieces supported on the associated pintles 43 and 37.

A second geneva wheel quadrant 396 is provided on a fourth rock shaft 402 located above the third shaft 234 associated with the second geneva driver 384. The second geneva driver 384 has a driving pin 385 for engagement with a radially extending slot 397 in the geneva wheel quadrant 396 for oscillating the fourth rock shaft 402 thereby imparting oscillatory motion to the loading arm 36 for movement between the phantom and solid line positions shown in FIG. 2. As best shown in FIG. 3, the fourth rock shaft 402 has its forward end portion journaled in a bearing 406 provided for this purpose in the front wall 140 of sliding frame 40 and a similar bearing 422 is provided in he rear wall 144 of the frame 40 for rotatably supporting an opposite end portion of the rock shaft 402. The fourth rock shaft 402 includes a rearwardly extending splined portion 426 which receives a correspondingly splined insert in the lower end portion of the loading arm 36 in the same manner as described hereinabove with reference to the pivotally supported end portion of the unloading arm 52. As so constructed and arranged, the loading arm will be seen to operate in timed relationship with the unloading arm through the second geneva drive mechanism described hereinabove. More particularly, the loading arm is adapted to dwell at the work pickup or loading station, corresponding to the phantom line position shown in FIGS. 1 and 2, and when the driving pin 385 of the geneva driver 384 engages the radially extending slot 394 of the geneva quadrant 396, the shaft 402 and hence the loading arm 36 moves in a counterclockwise direction from the phantom line position shown to the full line position shown in these views. The concave arcuate faces of the geneva wheel quadrant 396 cooperate with the arcuate periphery of the plate 376 so as to achieve the desired dwell intervals for the loading arm at the work station and at the loading station, respectively.

As best shown in FIG. 1, a limit switch LS–2 is provided on the sliding frame and is adapted to be closed by a pin 468 on the arm 36 when the loading arm 36 has reached the work station. A second limit switch LS–1, provided immediately below the switch LS–2, is adapted to be closed when the loading arm 36 has reached the supply chute for picking up a succeeding workpiece 14. A slide rod 470 slidably received on the front side 140 of the frame 40 has its inner end (not shown) adapted to be engaged by a suitable abutment (not shown) on the unloading arm 52 (as suggested in FIGS. 1 and 4) in order to close the limit switch LS–1 when the unload arm has arrived at the work station.

The operation of the above described transfer mechanism can best be summarized with reference to FIG. 5 of the accompanying drawings. Initially, the sliding frame 40 is in its rearward or retracted position, and the loading arm 36 located in the phantom line position shown in the FIG. 1, that is, with the pintle 37 away from but aligned with the opening in the lowermost annular workpiece 14 located at the pickup position on the supply chute 20. In this position limit switch LS–3 will have been closed by action of the bracket 97, resulting from retraction of the sliding frame 40, and the unloading arm 52 will occupy the position shown in solid lines in FIG. 1, that is, it will be at the unload station and slide rod 470 will have moved to the right in FIG. 1 closing limit switch LS–1. From FIG. 5 it will be apparent that solenoid A is energized at this point, causing the frame 40 to advance in a forward direction as a result of fluid motor 72 being provided with a source of air under pressure in the line 73. Solenoid A represents a control portion of a valve (not shown) in this line 73. The pintles 37 and 53, on the loading and unloading arms 36 and 52, respectively, since they are carried on the frame 40, will also move forwardly to enter the openings in the annular workpieces 14, 14 located, respectively, at the pickup end of the supply chute 20, and the work station, a workpiece having been previously positioned at said work station. At this point, limit switch LS–4 will close, but solenoid B and TDR–2 will not be affected since limit switch LS–2 will still be open. Time delay relay TRD–1 will be energized concurrently with solenoid A, and its associated contacts, indicated generally at 450 in FIG. 5, will close upon expiration of a predetermined time delay so that solenoid C will then be energized and fluid motor 152 provided with a source of fluid pressure through a valve (not shown) and the unloading arm rotated from its work station position to the discharge position shown in full lines in FIG. 1. At a slightly later instant of time, the duration of which is dictated by the mechanical phase relationship between the gear segment 218 and the spur gear 230 as described hereinabove, the loading arm 36 will move from its phantom line position toward the solid line position shown in FIG. 2. As discussed above, the dwell interval of these arms is preferably such that while they do overlap, the loading arm will lag the unloading arm during this portion of the cycle of the above-described mechanism. FIG. 2 shows the phase relationship between the two separate and distinct geneva drive mechanisms associated with the loading and unloading arms for achieving this sequential movement. As brought out in detail hereinabove, the phase relationship between the loading and unloading arms can be conveniently adjusted with respect to one another to vary the dwell overlap between these arms so as to permit the mechanism to accommodate workpieces of various size in a compact device wherein two relative short arms move through angles no greater than 90°, and without encountering interference problems between the workpiece handled by the loading arm and the unloading arm.

When the loading arm 36 has reached the solid line position shown in FIG. 1 to carry an unground workpiece to the work station, the unloading arm will have removed a ground workpiece from the work station and have reached the position shown in FIG. 1 in full lines. The above-described pin 468 provided for this purpose on the loading arm closes limit switch LS–2 at this point. Limit switch LS–4 will have been previously closed as a result of forward sliding movement of the frame 40 in the manner described above, and hence solenoid B will now be energized so as to cause fluid under pressure to reach the opposite side of the fluid motor 72 through the pressure line 71 causing the sliding frame 40 to return to its initial position and the pintles 37 and 53 will be withdrawn from their associated workpieces. The magnetic shoes 16, 16 at the work station assure that the pintle 37 on the loading arm 36 is so withdrawn, and the flange 64 on the discharge chute 56 assures the unloading arm pintle 53 is so withdrawn. A time delay relay TDR–2 will be energized simultaneously with solenoid B, and its associated contacts 452 will be closed upon the expiration of a predetermined time delay energizing solenoid D which controls a valve (not shown) so as to allow fluid under pressure to reach the opposite side of the rotary fluid motor 152 in order to rotate the geneva mechanisms in their opposite directions in order to return the loading and unloading arms to their initial positions prior to initiating another cycle of operation. As suggested in FIG. 2, the loading arm will initiate its return movement prior to that of the unloading arm in a manner opposite to the dwell overlap described hereinabove with reference to forward rotational movement of these arms in the handling of the workpieces as they pass from and to the work station.

I claim:

1. A mechanism for sequentially transferring annular workpieces to and from a work station comprising a frame mounted for limited sliding movement parallel to the axis of rotation of said workpieces when they are located at said work station, a workpiece loading arm pivotally mounted in said frame for rotational movement in a plane that is perpendicular to the direction of movement of said frame and between angular limits defined by said work station and a load station, a workpiece unloading arm pivotally mounted in said frame for rotational movement in substantially the same plane and between angular limits defined by said work station and an unload station, means for moving said loading and unloading arms intermittently between their respective angular limits and with dwell intervals at each associated station, drive means for moving said frame in a forward direction when said unloading arm is at said work station and when said loading arm is at said load station, and said intermittently movable arms being timed with respect to one another so that as the loading arm is moving from said load station to said work station it lags the unloading arm as the latter moves from said work station to said unload station to provide adequate clearance between the workpieces carried by said arms in the vicinity of the work station.

2. The mechanism set forth in claim 1 wherein said loading arm has a portion of its dwell interval at said load station which overlaps the dwell interval of said unloading arm at said work station, said drive means sliding said frame forwardly during said dwell overlap so that a workpiece to be ground is loaded on said loading arm and a ground workpiece is loaded on said unloading arm for movement to said work station and said unload station respectively.

3. The mechanism as set forth in claim 2 wherein said loading arm has a portion of its dwell interval at said work station which overlaps the dwell interval of said unloading arm at said unload station, and said drive means also serving to slide said frame rearwardly during said dwell overlap of said loading and unloading arms at said work station and said unload station respectively, whereupon a workpiece is discharged from said loading arm and unloading arm at said work station and discharge station respectively.

4. The mechanism as set forth in claim 3 further including a fixed frame having guide means for slidably receiving said sliding frame, said drive means being provided between said fixed frame and said sliding frame to move the sliding frame forwardly and rearwardly.

5. The mechanism as set forth in claim 4 wherein said loading and unloading are members have first and second pintle members respectively for insertion into the openings defined by said annular workpieces.

6. The mechanism as set forth in claim 5 wherein said means for moving said loading and unloading arms includes a rotary motor means mounted on said frame, and intermittent motion means driven by said rotary motor and drivingly connected to said arms.

7. The mechanism as set forth in claim 6 wherein said intermittent motion means for moving said unloading arm includes a first crank arm with a pin member at one end, a first geneva quadrant intermittently engaged by said pin member and connected to said unloading arm so that said unloading arm is intermittently moved.

8. The mechanism as set forth in claim 7 wherein said intermittent motion means for moving said loading arm further includes a second crank arm with a pin member at one end, a second geneva quadrant intermittently engaged by said pin member and connected to said loading arm so that said loading arm is intermittently moved.

9. The mechanism as set forth in claim 8 wherein said first and second geneva quadrants comprise a first and second rotating plate member having radial slots therein wherein said pin members pass into said slots to drive said plate members.

10. The mechanism as set forth in claim 9 wherein said first and second crank arms are mounted to a first and second shaft respectively for rotation therewith.

11. The mechanism as set forth in claim 10 wherein said first and second geneva quadrants are mounted on third and fourth shafts respectively for rotation therewith.

12. The mechanism as set forth in claim 11 further including first and second cam means mounted to said first and second shafts respectively, and first and second cam follower means mounted on said third and fourth shafts for engaging said first and second cam means to lock said third and fourth shafts in nonrotating positions during said dwell intervals.

13. The mechanism as set forth in claim 12 wherein said first and second cam means have first and second substantially circular plate members mounted to said first shaft and second shafts respectively and having that portion of each of said plate members adjacent said first and second crank arms respectively recede away from the circular contours of said plate members on each side of both crank arms.

14. The mechanism as set forth in claim 13 wherein said first and second cam follower means comprise concave circular segments located on each side of said radial slots in said first and second plate members, which concave segments are engaged by said first and second circular cam means respectively to lock said third and fourth shafts and the loading and unloading arms in a nonrotating position.

15. The mechanism as set forth in claim 14 further including first and second gears mounted on said first and second shafts respectively, said rotary motor drivingly connected to one of said gears and said gears being engaged with one another to drive said first and second shafts in timed relationship with one another.

16. The mechanism as set forth in claim 15 further including circuit means for operating said drive means said circuit means including first switch means responsive to the arrival of said loading arm to its loading station to move said sliding frame forwardly and second switch means responsive to the arrival of said unloading arm at said work station to move said sliding frame rearwardly.

17. The mechanism as set forth in claim 16 further including circuit means for controlling said motor means, said circuit means including time delay relay means for rotating said loading and unloading arms only after a predetermined time delay following movement of said sliding frames.

18. The mechanism as set forth in claim 17 further including workpiece supply means for advancing workpieces to said loading station for pickup by said loading arm.

19. The mechanism as set forth in claim 18 further including workpiece discharge means for receiving workpieces at said discharge station following delivery thereto by said unloading arm.

20. The combination set forth in claim 19 further including magnetic shoe means and a grinding wheel at said work station, said loading arm serving to deposit a workpiece on said shoe means so that it may be operated upon by said grinding wheel at said station.

21. The combination as set forth in claim 20 wherein said discharge chute further includes means for stripping a workpiece from the pintle of said unloading arm at said discharge station.

22. In a grinding apparatus having a fixed frame, magnetic shoes for holding a workpiece at a work station, and a grinding wheel mounted such that it is adapted to operate upon workpieces positioned on said shoes the improvement comprising a mechanism for sequentially transferring annular workpieces to and from said work station including a sliding frame mounted on said fixed frame for limited sliding movement parallel to the axes of rotation of said workpieces when they are positioned at the work station, a workpiece loading arm pivotally mounted on said frame for rotational movement in a plane that is perpendicular to the direction of movement of said sliding frame between angular limits defined by the work station and a load station, a workpiece unloading arm pivotally mounted in said frame for rotational movement in substantially the same plane between angular limits defined by said work station and a unload station, means for moving said loading and unloading arms intermittently between their respective angular limits and with dwell intervals at each associated station, drive means for moving said sliding frame in a forward direction when said unloading arm is at said work station and when said loading arm is at said load station and said intermittently movable arms being timed with respect to each other so that as the loading arm is moving from said load station to said work station it lags the unloading arm as the latter moves from said work station to said unload station to provide adequate clearance between the workpieces carried by said arms in the vicinity of the work station.

* * * * *

/ PO-1050
(5/69)

UNITED STATES PATENT OFFICE
CERTIFICATE OF CORRECTION

Patent No. 3,640,026　　　　　　　　Dated February 8, 1972

Inventor(s)　Richard J. Flanigan

It is certified that error appears in the above-identified patent and that said Letters Patent are hereby corrected as shown below:

Col. 2, line 21, "slide" should be "side".

Col. 3, line 48, "is" should be "its".

Col. 4, line 4, "ylinder" should be "cylinder".

Col. 4, line 43, after "Operation" insert "of the fluid motor".

Col. 5, line 8, "on" should be "to".

Col. 5, line 66, "he" should be "the"

Col. 6, line 52, "TRD" should be "TDR".

Signed and sealed this 5th day of September 1972.

(SEAL)
Attest:

EDWARD M. FLETCHER, JR.
Attesting Officer

ROBERT GOTTSCHALK
Commissioner of Patents